Dec. 1, 1925.
C. O. FISHER
POWDER RECEPTACLE FOR HANDLES
Filed Dec. 16, 1921
1,563,352
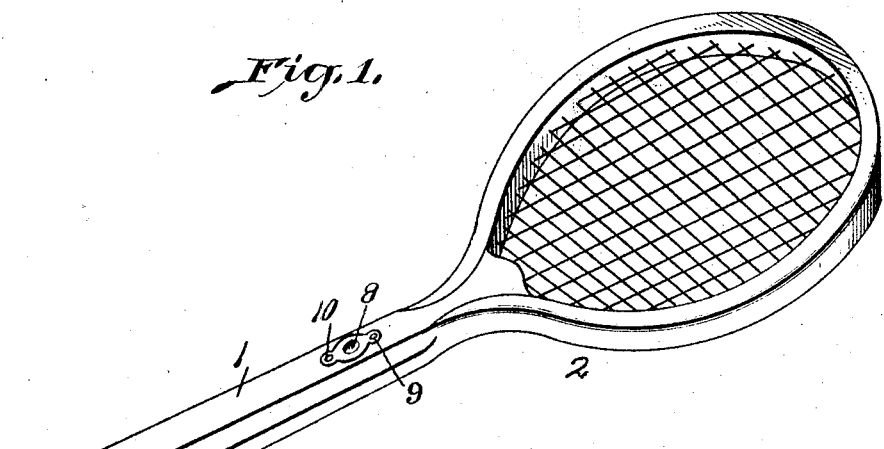
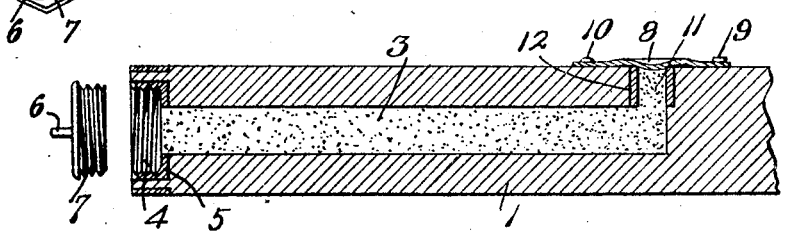
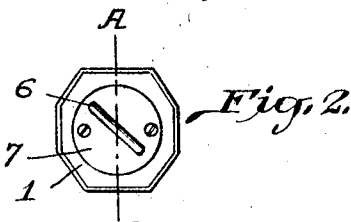
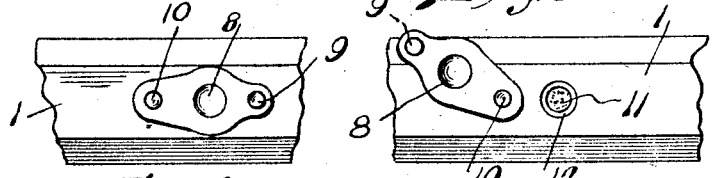
Inventor:
Charles O. Fisher,
By F. G. Fischer, Atty.

Patented Dec. 1, 1925.

1,563,352

UNITED STATES PATENT OFFICE.

CHARLES O. FISHER, OF WELLSVILLE, KANSAS.

POWDER RECEPTACLE FOR HANDLES.

Application filed December 16, 1924. Serial No. 756,373.

*To all whom it may concern:*

Be it known that I, CHARLES O. FISHER, a citizen of the United States, and resident of Wellsville, county of Franklin, and State of Kansas, have invented certain new and useful Improvements in Powder Receptacles for Handles, of which the following is a full and exact specification.

The present invention relates to the handles of manually operated devices, such as tennis rackets, base ball bats, tools and the like, and aims to provide a novel handle structure embodying a powder receptacle handle for the purpose of providing a convenient and readily available source of powder supply for application to the hands of the person making use of such devices.

To this end I propose to provide a handle structure having the free end thereof formed with the mouth of the receptacle, equipped with a suitable cap on removal of which the powder receptacle may be filled and replenished as often as necessary and said receptacle, further up the handle, shall have an opening for the discharge of the powder in suitable quantities for application to the hands of the party using the device of which the handle is a part. This last opening shall have a cap over same which either by moving from, or leaving on, will let the powder out or keep it in, respectively, as desired.

I have also sought to devise a neat, simple and attractive construction of the type described and adapted for easy manipulation in the use thereof, and also for cheapness of manufacture.

With these words of preface, the invention will now be described with reference to the accompanying drawing, illustrating one form of construction which has been devised for embodying the improvement after which the novel features thereof will be set forth and defined in the appended claims.

In the drawing—

Figure 1 is a perspective view of a tennis racket having its handle portion constructed in accordance with the present invention.

Figure 2 is an enlarged end view of said handle portion.

Figure 3 is a sectional detail view, taken on the line A—A, of Figure 2.

Figure 4 shows the cap over the opening thru which the powder is shaken out.

Figure 5 shows the same cap turned back, disclosing the opening thru which the powder is shaken out.

Referring to the said drawing now in detail, this shows the invention, for purposes of illustration merely, as applied to the handle portion 1 of a tennis racket 2, although it will be understood that the improvements are equally adapted for use in connection with the handles of other devices such as baseball bats, golf sticks, tools and all similar manually operated devices of the same character.

At the free end of the handle 1, the same is formed with a well or receptacle 3, adapted to form a container of suitable size for receiving a supply of powder, such as powdered rosin or the like. The mouth of this receptacle 3 is rabbeted out for receiving in countersunk relation an internally threaded ring 5 with its outer face flush with the end of the face of the handle.

For sealing the mouth of the receptacle 3 a cap member 7 is provided in the form of a sheet metal disk with a projection 6 whereby the cap may be manipulated with the fingers. The cap is threaded enabling it to be screwed down in the threads 4, in the ring 5, thus closing the opening. The cap 7 must be removed preparatory to filling the receptacle 3 with any powder substance.

8 designates a cap made out of spring metal which is retained by a screw 9 over the upper opening 11 of receptacle 3. This metal piece can be moved over, or from over, the opening 11 by pressing sideways on the projection 10 sticking up on the cap 8. 12 designates a ring made to line the hole 11 thru which the powder is shaken out whenever the player desires, first by pushing back the cap 8 and then striking the hole face down upon the hand with which the racket is gripped in playing.

This is a device for which, especially in the game of tennis, there is a great need. Tennis is mostly played under the blazing hot sun, necessitating great perspiration by those who are in anyways subject to perspiring. This perspiration gets into the palm of one's hand which is gripping the tennis racket. This moistened condition causes the intense grip which one must maintain, to give way and slip on the moment of racket impact with ball.

This slip, though the merest fraction, will ruin and lose a terrific drive close to the line. It will not only ruin a hard shot but it will also ruin the slower shots varying them in height, distance, and direction. Many a close match can be lost by annoyances and handicaps far less prevalent and dangerous than this of a slipping grip.

What I claim is:

1. In an article of the character described, a handle provided with a receptacle for containing powder, a threaded ring countersunk into the mouth of said receptacle, a cap member threaded into said ring and a closure element movably mounted further up the handle for normally closing a discharge opening leading from the receptacle.

2. In an article of the character described, a handle provided with a receptacle for containing powder, a threaded ring countersunk into the mouth of said receptacle, a cap member threaded into said ring and provided with a projection and a closure element of spring metal movably mounted further up the handle over a discharge hole leading from the powder receptacle.

3. In an article of the character described, a handle provided with a receptacle having an inlet at one end of said handle and an outlet leading out of the handle at a suitable distance from said inlet, a removable cap member for closing said inlet, and a cap pivotally mounted upon the handle for normally closing said outlet.

In witness whereof I affix my signature.

CHARLES O. FISHER.